(12) United States Patent
Lindbloom et al.

(10) Patent No.: US 11,235,523 B2
(45) Date of Patent: Feb. 1, 2022

(54) RESIN EXTRUSION PRINTHEAD FOR 3D PRINTING

(71) Applicant: BOARD OF TRUSTEES OF THE UNIVERSITY OF ARKANSAS, Fayetteville, AR (US)

(72) Inventors: Casey Trent Lindbloom, Frontenac, KS (US); Wenchao Zhou, Springdale, AR (US)

(73) Assignee: Board of Trustees of the University of Arkansas, Fayetteville, AR (US)

( * ) Notice: Subject to any disclaimer, the term of this patent is extended or adjusted under 35 U.S.C. 154(b) by 113 days.

(21) Appl. No.: 16/582,994

(22) Filed: Sep. 25, 2019

(65) Prior Publication Data

US 2020/0094477 A1 Mar. 26, 2020

Related U.S. Application Data

(60) Provisional application No. 62/736,980, filed on Sep. 26, 2018.

(51) Int. Cl.
| | | |
|---|---|---|
| *B29C 64/209* | (2017.01) | |
| *B29C 64/255* | (2017.01) | |
| *B29C 64/277* | (2017.01) | |
| *B29C 64/227* | (2017.01) | |
| *B29C 64/295* | (2017.01) | |
| *B33Y 30/00* | (2015.01) | |
| *B29C 64/106* | (2017.01) | |

(52) U.S. Cl.
CPC .......... *B29C 64/209* (2017.08); *B29C 64/227* (2017.08); *B29C 64/255* (2017.08); *B29C 64/277* (2017.08); *B29C 64/295* (2017.08); *B29C 64/106* (2017.08); *B33Y 30/00* (2014.12)

(58) Field of Classification Search
CPC ... B29C 64/106; B29C 64/209; B29C 64/227; B29C 64/255; B29C 64/277; B29C 64/295; B33Y 30/00
See application file for complete search history.

(56) References Cited

U.S. PATENT DOCUMENTS

| | | | | |
|---|---|---|---|---|
| 5,134,569 A | * | 7/1992 | Masters | B29C 35/08 700/182 |
| 5,139,710 A | * | 8/1992 | Smith | B29B 15/122 264/103 |
| 6,280,784 B1 | * | 8/2001 | Yang | B29C 64/106 426/231 |
| 2002/0113331 A1 | * | 8/2002 | Zhang | B29C 41/003 264/40.1 |
| 2015/0077215 A1 | * | 3/2015 | Ranky | H05K 3/1258 338/47 |

(Continued)

OTHER PUBLICATIONS

* Written Opinion of the International Search Authority filed on Feb. 4, 2020 of WO2019US53003 (Published as WO2020069016 dated Apr. 2, 2020). (Year: 2020).*

(Continued)

*Primary Examiner* — Joseph S Del Sole
*Assistant Examiner* — Manley L Cummins, IV
(74) *Attorney, Agent, or Firm* — Keith A. Vogt; Keith Vogt, Ltd.

(57) ABSTRACT

A 3D printer comprising a pump, stepper motor adapted to drive the pump and a printing arm connected to a curing source and nozzle.

16 Claims, 5 Drawing Sheets

(56) References Cited

U.S. PATENT DOCUMENTS

| | | | | |
|---|---|---|---|---|
| 2015/0174821 | A1* | 6/2015 | Levine | B33Y 10/00 |
| | | | | 264/401 |
| 2016/0332382 | A1* | 11/2016 | Coward | B33Y 10/00 |
| 2017/0057164 | A1* | 3/2017 | Hemphill | B29C 64/295 |
| 2017/0122322 | A1* | 5/2017 | Zinniel | B33Y 10/00 |
| 2017/0151733 | A1* | 6/2017 | Lewis | B29C 64/106 |
| 2017/0172765 | A1* | 6/2017 | Solorzano | B33Y 70/00 |
| 2017/0203506 | A1* | 7/2017 | Hjelsand | B29C 48/37 |
| 2017/0210064 | A1* | 7/2017 | Aw | B29C 48/29 |
| 2017/0297251 | A1* | 10/2017 | Tyler | B33Y 30/00 |
| 2017/0341297 | A1* | 11/2017 | Xu | B29C 64/112 |
| 2018/0215071 | A1* | 8/2018 | Heng | B29C 64/209 |
| 2018/0311898 | A1* | 11/2018 | Schwarzbaum | B29C 64/264 |

OTHER PUBLICATIONS

• International Search Report filed on Feb. 4, 2020 of WO2019US53003 (Published as WO2020069016 dated Apr. 2, 2020) (Year: 2020).*

P. F. Jacobs, "Fundamentals of Stereo-lithography," 3D Systems Inc., Valencia California, 1992.

Egbe, E.A.P. "Design Analysis and Testing of a Gear Pump." International Journal of Engineering and Science 3.2 (2013): n. pag. Web. Feb. 10, 2017; <http://www.researchinventy.com/papers/v3i2/A0320107.pdf>.

Pusch, Kira, Thomas J. Hinton, and Adam W. Feinberg. "Large volume syringe pump extruder for desktop 3D printers." HardwareX 3 (2018): 49-61 <https://reader.elsevier.com/reader/sd/82FB18055 FDFF2F8A1CC86FEE140A2A862ADEC35F7791E87B13B0482C 1510BFAF619F59D54437F3D4C4B1B26439F04A1>.

Horne, Richard; "Reprap Development and further adventures in DIY 3D printing"; 4. https://richrap.blogspot.com/2012/08/geared-peristaltic-quick-fit-pump html.

Verderflex; How Do Peristaltic Dosing Pumps Work? How Do Peristaltic Pumps Work | Pump Technology | Peristaltic Pumps—Hose and Tube Pumps Manufacturer—Peristaltic Pumps, www.verderflex.com/en/how-do-peristaltic-pumps-work/.

Smith, Useful Information on Gear Pumps. Michael Smith Engineers Ltd, www.michael-smith-engineers.co.uk/resources/useful-info/gear-pumps.

Formlabs; "Safety Data Sheet for Clear Photoreactive Resin for Form 1, Form 1+, and Form 2." formlabs, https://formlabs-media.formlabs.com/datasheets/Safety_Data_Sheet_EN_-_Clear.pdf.

* cited by examiner

RESIN EXTRUSION PRINTHEAD FOR 3D PRINTING

RELATED APPLICATIONS

This application claims priority to U.S. Provisional Application Ser. No. 62/736,980 filed on Sep. 26, 2018, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Desktop 3D printers have gained increasing popularity in recent years. Fused deposition modeling (FDM) based 3D printers are currently dominating the desktop 3D printing market due to their ease of use. However, FDM is not sufficient for the market needs because it only can print with thermoplastic filaments.

Stereolithography (SLA), the first invented 3D printing process by 3D Systems in 1984, remains a very popular 3D printing process due to its capability to print with liquid resin by using a laser (or another light source) to scan over a resin tank and selectively cure the liquid resin. Due to the properties of the liquid resin, parts printed SLA usually have improved surface finish and isotropic properties compared to FDM.

However, SLA is not as friendly to regular consumers for several reasons. First, the cost of the SLA printer is usually much higher. Second, it requires careful postprocessing, which is a very messy process due to the need to clean the sticky resin when the printed part is taken out of the resin tank. The post-processing usually requires the users to wear gloves and not friendly for home or office use, which also takes a lot of time and significantly increases the labor cost. Third, the use of a resin tank usually leads to a lot of waste of the expensive resin because it is difficult to use all the resin and to recoup unused resin in the resin tank due to the possibility of contamination. Fourth, the resin tank is usually a consumable, which needs to be replaced frequently to ensure the printing quality.

Although it is possible to mount a syringe on an FDM printer to print liquid resin, it is not practical due to the limitation of the syringe volume, which would require constant refill and interrupt the printing process.

BRIEF SUMMARY OF THE INVENTION

In one embodiment, the present invention provides a method, approach, device, and system concerning a printhead that can print liquid resin on an FDM printer and therefore enjoy the ease of use of FDM and the benefits of SLA.

In another embodiment, the present invention provides a method, approach, device, and system with a miniaturized gear pump that can continuously drive the liquid resin from a resin tank to the nozzle.

In another embodiment, the present invention provides a method, approach, device, and system that cures the extruded resin using UV LED light immediately after extrusion.

In another embodiment, the present invention provides a method, approach, device, and system that, compared to other pumping mechanisms, provides a miniaturized gear pump that enables liquid resin to be extruded at a predetermined or specified flowrate consistently.

In another embodiment, the present invention provides a method, approach, device, and system that only requires a small change to existing FDM 3D printers by connecting a stepper motor to an existing screw-based extruder to the driving shaft of the pump and replacing the hot-end and fan with a simple nozzle and an array of UV LEDs.

In another embodiment, the present invention provides a method, approach, device, and system that contributes to a new method to print liquid resin with a regular FDM printer. It advances the field of 3D printing in the following aspects:

It provides an inexpensive way to retrofit a low-cost FDM printer for printing liquid resin, which presently is mostly printed by stereolithography based processes.

It eliminates the use of a resin tank and only deposit resin where it is needed, which reduces waste and cost.

It does not require messy post-processing and thus reduces labor cost.

It makes resin printing more accessible to consumers.

In another embodiment, the present invention provides a method, approach, device, and system that enables the printing of any materials in liquid form, as long as there is a way to turn the liquid material into solid quickly, such as hydrogels, PDMS, pastes, adhesives, etc.

In another embodiment, the present invention provides a method, approach, device, and system that prints adhesives.

In another embodiment, the present invention provides a method, approach, device, and system that enable additive manufacturing of exotic materials (e.g., carbon fiber) by providing a printhead that can lay carbon fiber tapes while in the meantime deposit adhesives. This new method and system can significantly expand the application of the easy-to-use low-cost extrusion-based 3D printers and speed up the adoption of 3D printing.

In another embodiment, the present invention provides a method, approach, device and system that provides an inexpensive way to enable a regular FDM printer to print with liquid resin, which has many advantages over stereolithography, such as lower cost, ease of use, cleaner, less post-processing, less waste of materials, less consumables needed, etc.

In another embodiment, the present invention provides a method, approach, device, and system that, compared to the SLA printers in the market, has the following advantages:
1. Lower cost: only need to retrofit a low-cost FDM printer, which is significantly cheaper than an SLA printer.
2. Ease of use: FDM printers are much more accessible and easier to use than SLA printers.
3. Cleaner: no need to deal with the messy resin tank and the sticky resins are mostly well contained in our method.
4. Less post-processing: no need to clean off the part after printing
5. Less waste of materials: only deposit resin where it is needed and avoid waste of resin in the resin tank.
6. Fewer consumables needed: no need to replace the resin tank once in a while and no need to use excessive cleaning agent after every print.

7. The possibility of printing larger parts: as the size of the print increases for SLA, the resin tank also needs to be larger, and it becomes increasingly difficult to level the liquid surface as the resin tank gets larger. FDM printers can be made much larger than SLA printers.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
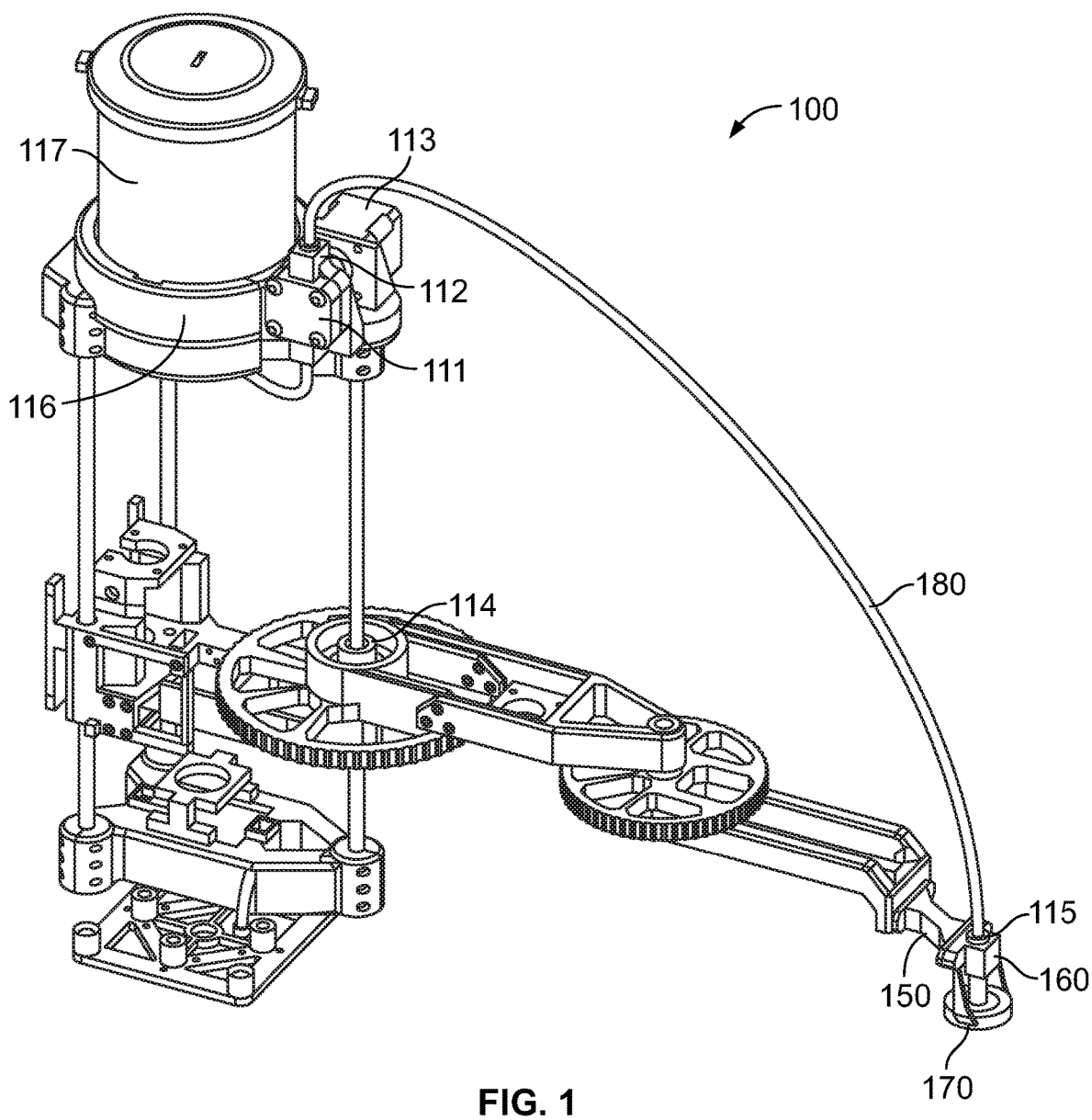
FIG. 1 is an isometric view of the 3D printer for embodiment of the present invention.

In a preferred embodiment, the present invention provides a method, approach, device, and system that is comprised of a miniaturized gear pump and a nozzle mount for use with printing system 100 as shown in FIG. 1. As shown, system 100 includes pump assembly 111, stepper motor 112, coupler 113, printing arm 114 which may be a selective compliance assembly robotic arm, nozzle assembly 115, z-axis topper 116 and reservoir 117, which in a preferred embodiment may be a tank assembly.

As further shown in FIG. 1, nozzle mount 150 is a simple fixture to carry nozzle 160 and curing source 170, which in a preferred embodiment may be a plurality of lights such as UV LEDs. The components may be mounted on the stages of the 3D printer for moving in XYZ and deposit and cure the liquid resin. A liquid source, such as tank 117, may be connected to the pump and nozzle using a UV resistant tube 180.

In other embodiments, the present invention may be used to print liquid from materials other than liquid resin, e.g., temperature sensitive hydrogels and PDMS. In those cases, the UV LEDs can be replaced with other mechanisms that can solidify the liquid (e.g., one or more small heaters or other heating elements).

Figure 2:
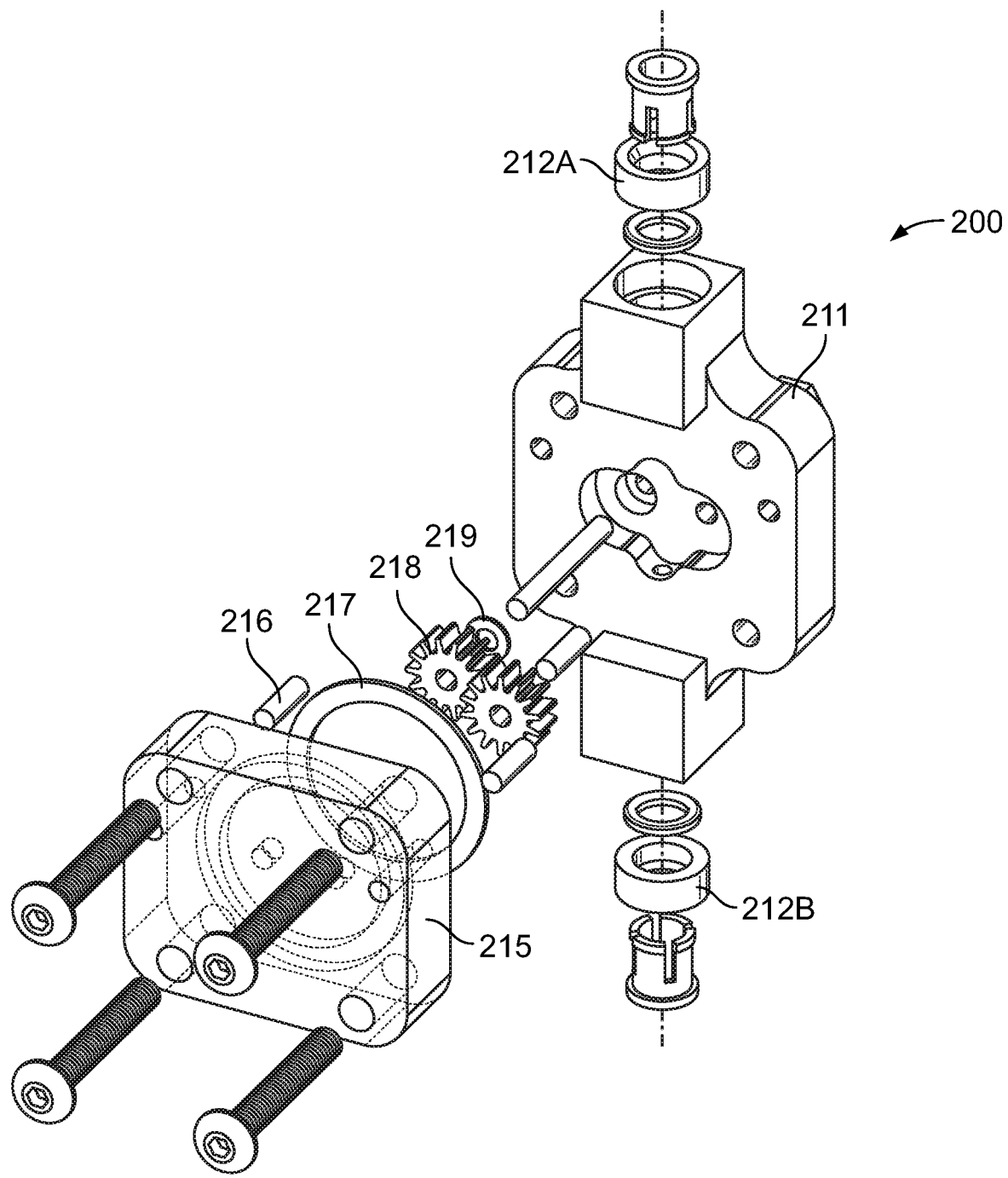
FIG. 2 is an exploded view of a pump assembly for embodiment of the present invention.

In one aspect, as shown in FIG. 2, the present invention provides a miniaturized pump 200. In a preferred embodiment, 200 is a gear pump which includes pump body 211, connection fittings 212A and 212B, faceplate 215, alignment pin 216, O-ring 217, teeth gears 218 and O-ring 219.

The driving gear is driven by a stepper motor in the 3D printer, which transfers liquid to the nozzle. The gear pump is specially designed to meet the following challenges: (a) Lightweight; (b) Small dimensions; (c) Capable of providing enough pressure to drive the flow of the resin; (d) Proper tolerance to make sure there is no leaking and the friction is small in the meantime; (e) Capable of adjusting the flow rate in the range needed by the 3D printer; (f) easy to clean; (g) not easy to clog. Specifically, the driven gear is left floating in the pump casing to ease the tolerancing requirement and avoid over-constraint. The tolerance of the pump casing is chosen based on the ranges of the flow rate and the viscosity of the liquid. The tightness of the faceplate is adjustable for balance between seal and friction.

Figure 3:
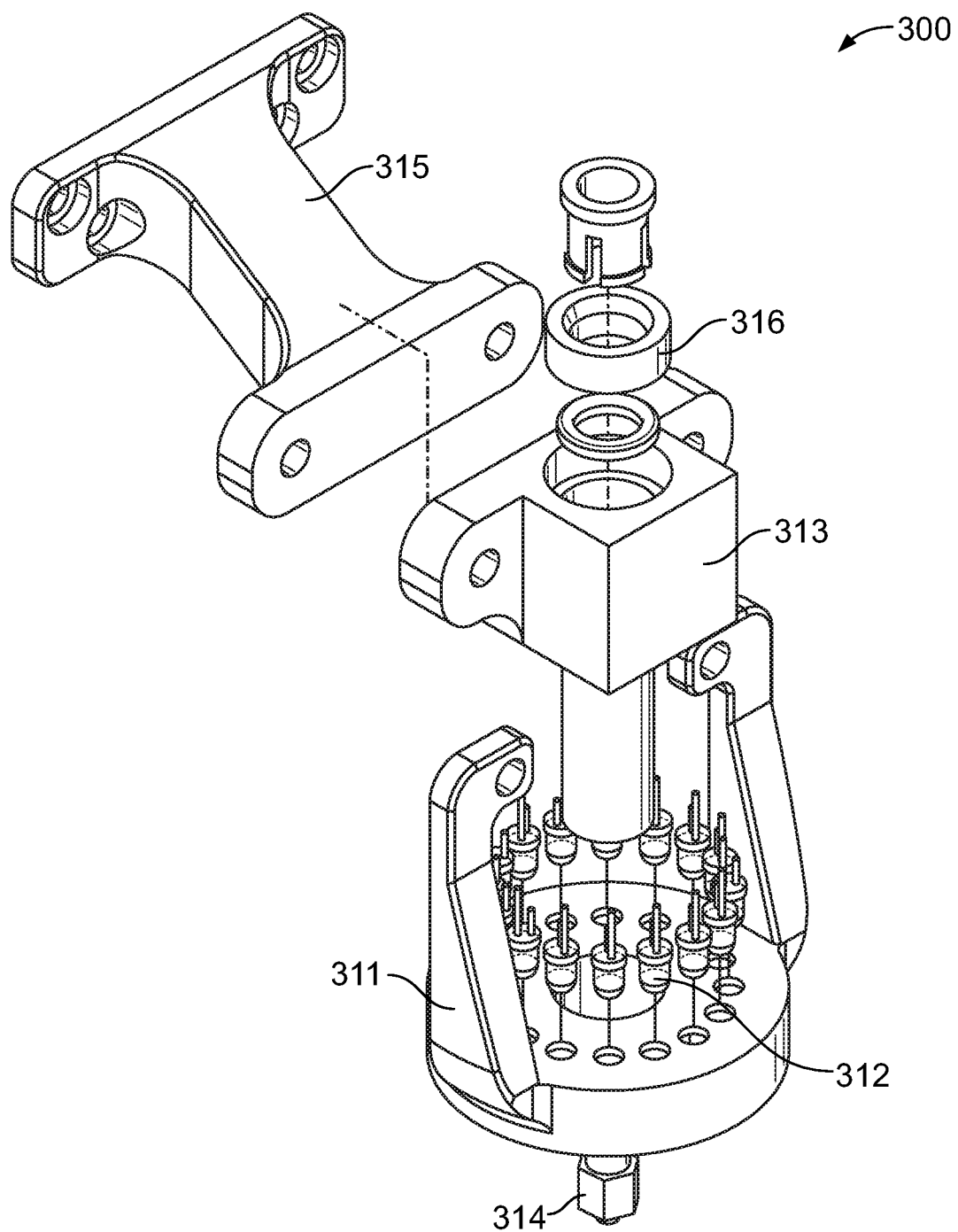
FIG. 3 is an exploded view of a curing assembly for embodiment of the present invention.
Figure 4:
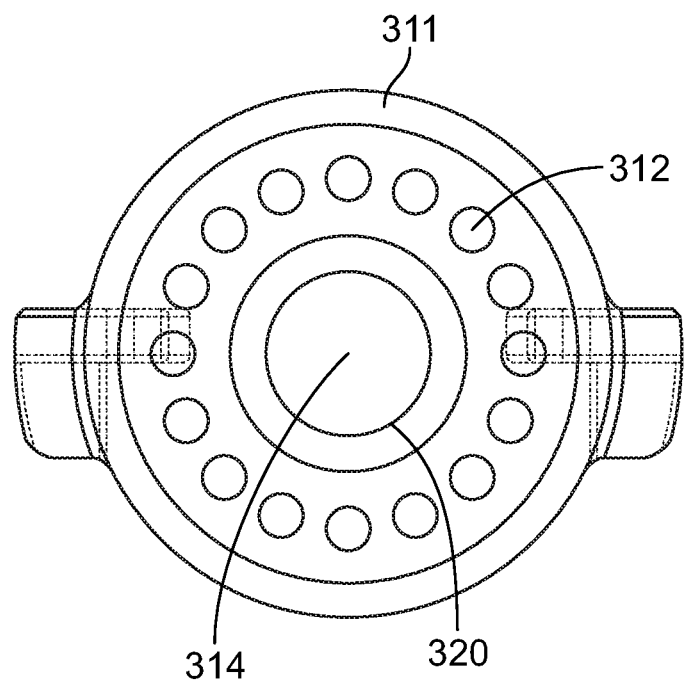
FIG. 4 is a bottom view of the embodiment shown in FIG. 3.

FIGS. 3 and 4 show a light source 300 that may be used with an embodiment of the present invention. In a preferred embodiment, light source 300 includes LED mount 311, a plurality of UV LEDs 312, nozzle mount 313 for securing nozzle 314 to the light source, tool mount 315 and grasping ring 316. As shown in FIG. 4, light source mount 311 is circular or ring-shaped in design and surrounds nozzle 314. As is also shown, light sources 312 also encircle nozzle 314 and are a spaced distance apart from nozzle 314 so as to provide annular gap 320. By locating the light source away from the nozzle and the nozzle opening, clogging is prevented as a result of eliminating the light source from curing resin inside the nozzle and on the nozzle outer surface.

Figure 5:
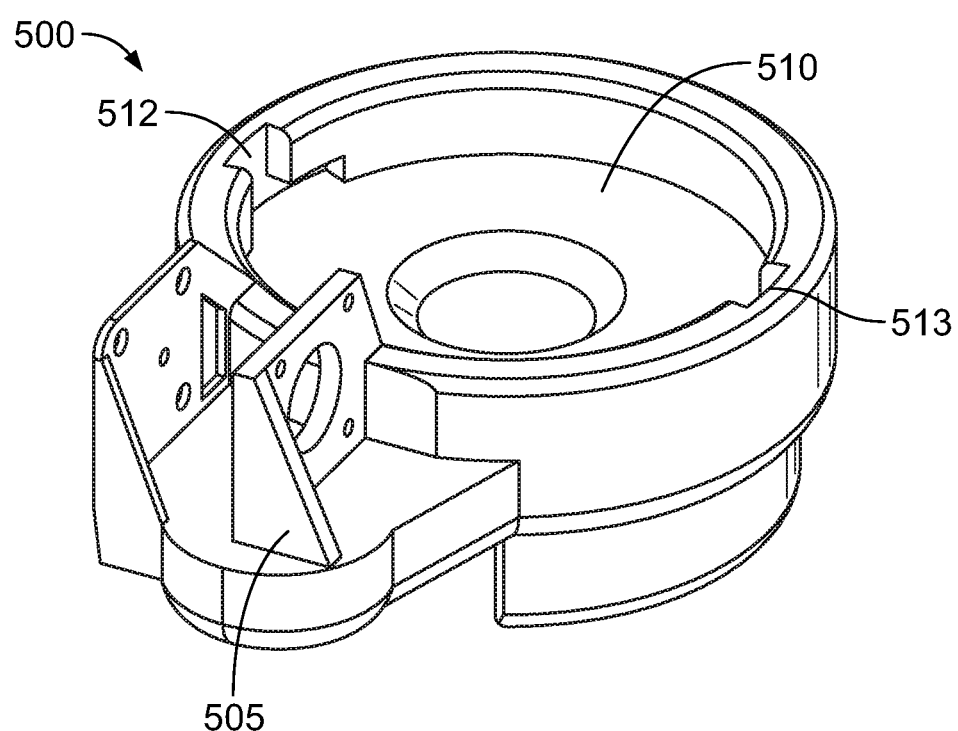
FIG. 5 illustrates a Z-axis topper for embodiment of the present invention

As shown in FIG. 5, topper 500 is adapted to receive a resin source such as a tank. In a preferred embodiment, mounting brackets 505 are provided as well as annular opening 510. Also included are notches 512 and 513 which are adapted to receive tabs located on the tank.

Figure 6:
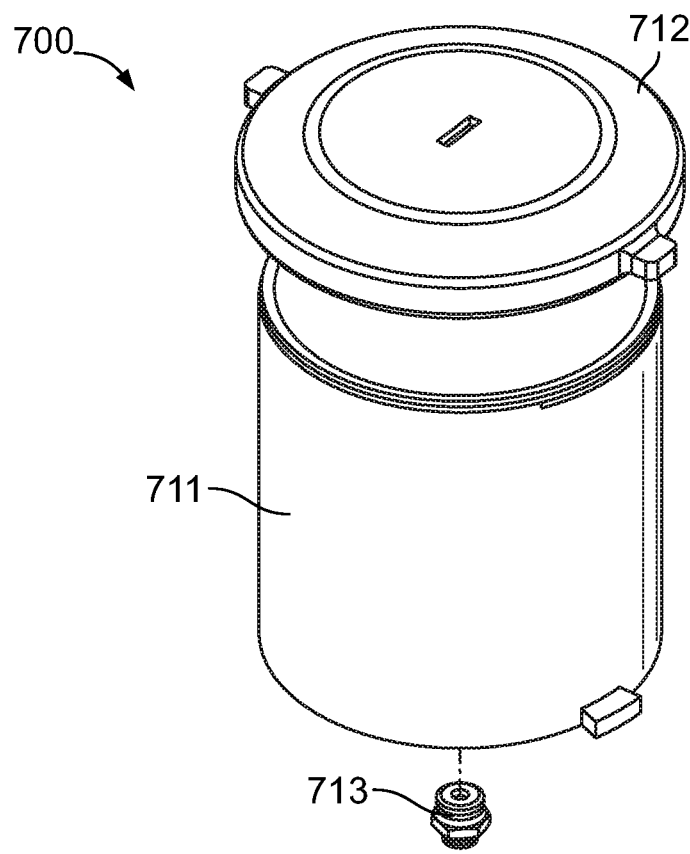
FIG. 6 illustrates a reservoir for embodiment of the present invention.
Figure 7:
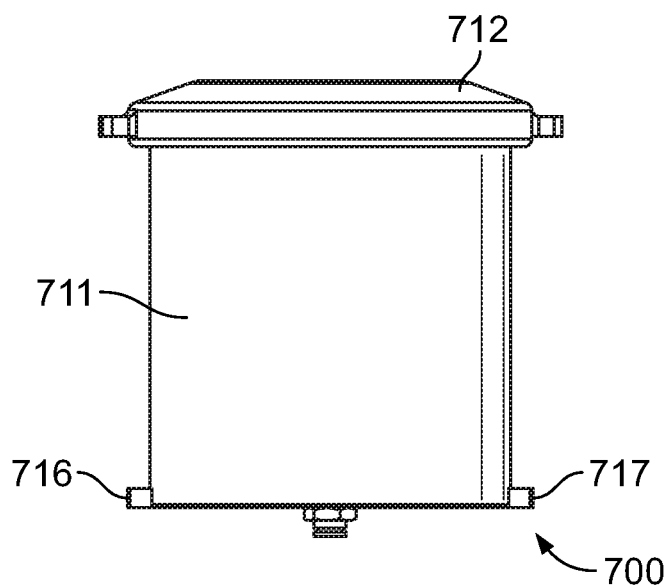
FIG. 7 is a front view of the embodiment shown in FIG. 6.

FIGS. 6 and 7 show a reservoir 700 which may be used within embodiment of the present invention. In a preferred embodiment, reservoir 700 may be in the form of a tank having a body 711 and lid 712. In addition, fittings 713 may be configured to connect to the pumping system of the device. Lastly, tabs 716 and 717 are sized to fit inside of and engage notches 512 and 513 of topper 500. In this configuration, the reservoir is removably attachable to topper 500.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A 3D printer comprising:
   a pump;
   stepper motor adapted to drive said pump;

a nozzle connected to a curing source;
a reservoir in communication with said nozzle and said pump;
wherein said nozzle is connected to a robotic arm; and
wherein said reservoir includes a plurality of tabs and said pump includes a housing having a plurality of notches configured to receive said tabs.

2. The 3D printer of claim 1 wherein said pump is a gear pump.

3. The 3D printer of claim 1 wherein said curing source is a light source that surrounds said nozzle.

4. The 3D printer of claim 3 wherein said light source is comprised of a plurality of lights mounted to a circular mount.

5. The 3D printer of claim 4 wherein said circular mount defines an opening in which said nozzle is located.

6. The 3D printer of claim 5 wherein said lights encircle said nozzle and are spaced distance from said nozzle.

7. The 3D printer of claim 6 wherein said lights are LED lights.

8. The 3D printer of claim 1 wherein said printer is adapted to print a resin.

9. The 3D printer of claim 1 wherein said printer is adapted to print hydrogels.

10. The 3D printer of claim 1 wherein said printer is adapted to print PDMS.

11. The 3D printer of claim 1 wherein said printer is adapted to print pastes.

12. The 3D printer of claim 1 wherein said printer is adapted to print adhesives.

13. The 3D printer of claim 2 wherein said gear pump includes a driven gear that is left floating in said pump to ease the tolerancing requirement and avoid over-constraint.

14. The 3D printer of claim 1 wherein said pump includes a faceplate and a casing, said faceplate is adjustable with respect to said casing.

15. The 3D printer of claim 1 wherein said curing source is comprised of one or more heating elements.

16. The 3D printer of claim 1 wherein said curing source is comprised of one or more heating elements and one or more LED lights.

\* \* \* \* \*